Nov. 2, 1954  A. B. BENSON ET AL  2,693,316
TIME AND PRODUCTION RECORDING APPARATUS
Filed Dec. 24, 1952  9 Sheets-Sheet 1

FIG. 1

INVENTORS
ALFRED B. BENSON
WILLIAM F. HENRY
BY
*G. R. Guyger*
AGENT

Nov. 2, 1954  A. B. BENSON ET AL  2,693,316
TIME AND PRODUCTION RECORDING APPARATUS
Filed Dec. 24, 1952  9 Sheets-Sheet 2

FIG. 2

INVENTORS
ALFRED B. BENSON
WILLIAM F. HENRY
BY
*G. P. Gugger*
AGENT

Nov. 2, 1954  A. B. BENSON ET AL  2,693,316
TIME AND PRODUCTION RECORDING APPARATUS
Filed Dec. 24, 1952  9 Sheets-Sheet 3

FIG. 3

INVENTORS
ALFRED B. BENSON
WILLIAM F. HENRY
BY
AGENT

Nov. 2, 1954  A. B. BENSON ET AL  2,693,316
TIME AND PRODUCTION RECORDING APPARATUS
Filed Dec. 24, 1952  9 Sheets-Sheet 4

FIG. 4

INVENTORS
ALFRED B. BENSON
WILLIAM F. HENRY
BY
*G. R. Gripper*
AGENT

Nov. 2, 1954

A. B. BENSON ET AL 2,693,316

TIME AND PRODUCTION RECORDING APPARATUS

Filed Dec. 24, 1952

INVENTORS
ALFRED B. BENSON
WILLIAM F. HENRY

BY

*G. R. Gugger*

AGENT

Nov. 2, 1954

A. B. BENSON ET AL 2,693,316

TIME AND PRODUCTION RECORDING APPARATUS

Filed Dec. 24, 1952

INVENTORS
ALFRED B. BENSON
WILLIAM F. HENRY

BY

AGENT

Nov. 2, 1954

A. B. BENSON ET AL 2,693,316

TIME AND PRODUCTION RECORDING APPARATUS

Filed Dec. 24, 1952

INVENTORS
ALFRED B. BENSON
WILLIAM F. HENRY

BY

*G. L. Gugger*

AGENT

Nov. 2, 1954

A. B. BENSON ET AL 2,693,316

TIME AND PRODUCTION RECORDING APPARATUS

Filed Dec. 24, 1952

INVENTORS
ALFRED B. BENSON
WILLIAM F. HENRY

BY

*G. L. Gugger*

AGENT

United States Patent Office 2,693,316
Patented Nov. 2, 1954

2,693,316

TIME AND PRODUCTION RECORDING APPARATUS

Alfred B. Bensen and William F. Henry, Endicott, N. Y., assignors to International Business Machines Corporation, New York, N. Y., a corporation of New York Application December 24, 1952, Serial No. 327,778

5 Claims. (Cl. 235—58)

This invention relates to a time and production recording apparatus and is more particularly directed to a device for use in making a printed record of the history of daily operation of a particular production machine.

It is well known that the obtaining of authentic source records has always been a major problem of modern accounting and control systems. In the "time" phase of this problem, industry has been adequately served through the use of many time recording devices. However, modern refinements in industrial operation have led to the increased need of source records upon which the control of production can be based such as, for example, a printed record of the quantity of units manufactured along with a record of the time that elapsed from the beginning to the end of the production cycle. If such records cannot be obtained authentically it can readily be understood that no system of control can be made to function efficiently.

The recording apparatus comprising the present invention is intended to be a general improvement over the recording devices which have been offered to industry in an effort to produce authentic production records. The invention has, purely for illustrative purposes, been embodied in a device for making a printed record of the history of the daily operation of a rolling mill which operates to reduce the thickness of strip stock to a predetermined value. In this instance the machine records the feet of strip stock reeling over a roller as well as the elapsed running time of the reeling operation. It is to be understood, however, that the invention is susceptible of modification and the same may be employed with a wide variety of production machines or methods.

In connection with the above described usage, it is among the objects of the invention to provide a recording device that will count, through its connection to a production machine, each unit manufactured and will upon receipt of a control impulse print the production total and the elapsed time from the beginning to the end of the production cycle.

Another object of the invention is to provide a recording device of this character having means to store counts at high speed and means for transferring said counts to printing instrumentalities for producing a printed record.

A still further object of the present invention is to provide a recording device of this character having a simple and rugged construction capable of standing up under usage with heavy machinery operating at high speeds.

Still another object of the present invention is to provide a recording device particularly adapted for usage where unknown quantities are to be measured and where a check on quality control is desired. This machine keeps a record of the number of passes (Fig. 9) specified to reduce the stock thickness to its ultimate shape. This is important to the proper processing of the strip stock.

Other objects and advantages of the invention will be set forth in detail subsequently, but in order that these may be more clearly understood, it is stated that a preferred embodiment of the invention involves, in its general organization, a series of impulse counters which are arranged in groups for cumulatively counting various items, periods of time, etc. Means are provided for actuating these counters either at definite time intervals or according to machine production. Printing instrumentalities are also provided and when a print impulse is received operating means are called in to disable the production count and the elapsed time count circuits and to enable control circuits to provide counter readout.

The operating means additionally conditions the operation of a print hammer, rocks a type sector shaft, feeds a print ribbon, and escapes a record feeding bed. Means associated with the type sector shaft emits impulses to the counters to step them forward to zero, in which position counter contacts close to trip type section arresting pawl magnets to stop individual type sectors in the position corresponding to the counter position, whereupon print hammers are released to effect printing. Means are provided for signalling the position of the counter wheels. Through zero contacts of the counters, any digit other than zero standing in any order is manifested by a closed contact in that order which transfers a relay to energize a red signal light, otherwise a green light is energized if all orders be at zero.

It is, then, another object of the present invention to provide a recording device of the character described having a plurality of high speed counters with novel means for effecting counter readout.

A further object of the present invention is to provide a recording device as just recited with means for signalling the position of the counter wheels; that is, whether the wheels rest at zero or at some digit other than zero.

Other objects of the invention will be pointed out in the following description and claims and illustrated in the accompanying drawings, which disclose, by way of examples, the principle of the invention and the best mode, which has been contemplated, of applying that principle.

In the drawings.

In all of the above described views like characters of reference are employed to designate like parts throughout.

Figure 1:
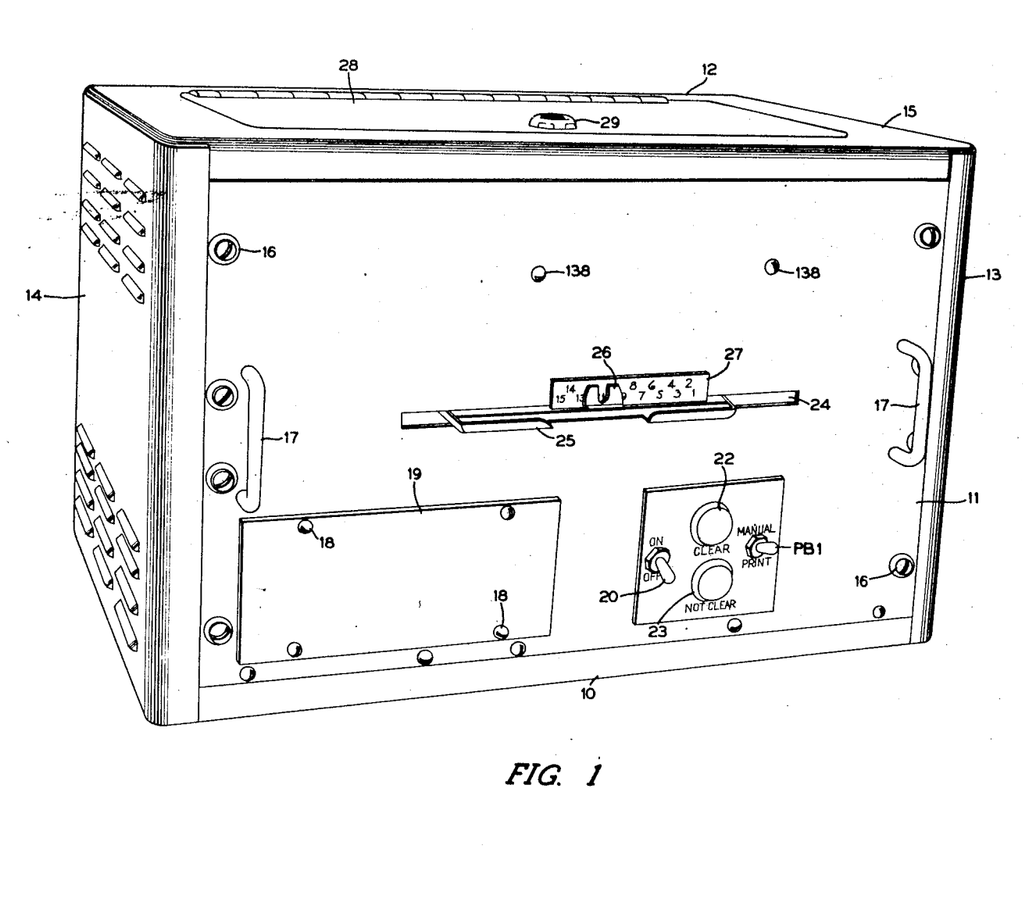
Fig. 1 is a perspective view of a recording apparatus constructed in accordance with the principles of the present invention.

A recording device embodying the invention is shown in its entirety in Fig. 1. This device may be attached to any type of machine or it may be used in any desired location where it is desired to secure accurate production and time records. The apparatus involves in its general organization a base plate 10 on which there is removably supported an outer machine casing or cover including a front wall 11, a rear wall 12, side walls 13 and 14 respectively, and a top wall 15. The front wall 11 is attached by means of the screws 16 and handles 17 are provided to facilitate the removal of same. Attached to the front wall 11 by means of screws 18 is a window plate 19 which may be easily removed for convenient access to the counting mechanism of the recorder, the nature of which will be made clear later on.

Also mounted on the front wall 11 for the convenience of the operator are two switches: an on-off switch 20 for controlling the electrical power to the machine and a manual print switch PB1 which may be used to control the operation of the printing mechanism in a manner to be described. A pair of indicator lights 22 and 23 are also provided: the indicator light 22 showing green when it is on to indicate to the operator that the counting devices in the recorder have been cleared of all totals and the indicator light 23 showing red when on to indicate that the counting devices have not been cleared of totals. A slot 24 in the front wall is adapted to receive a horizontally movable card holder 25 which has an upright indicator portion 26 adapted to move along a plate 27 attached to the front wall and having certain indicia marked thereon for purposes to be later described. The top wall 15 is provided wtih a hinged cover plate 28 which may be opened for convenient access to the recorder mechanism housed inside. The cover plate 28 has a lock 29 which may be used to prevent unauthorized persons from gaining access to the recorder mechanism.

Drive mechanism

Figure 2:
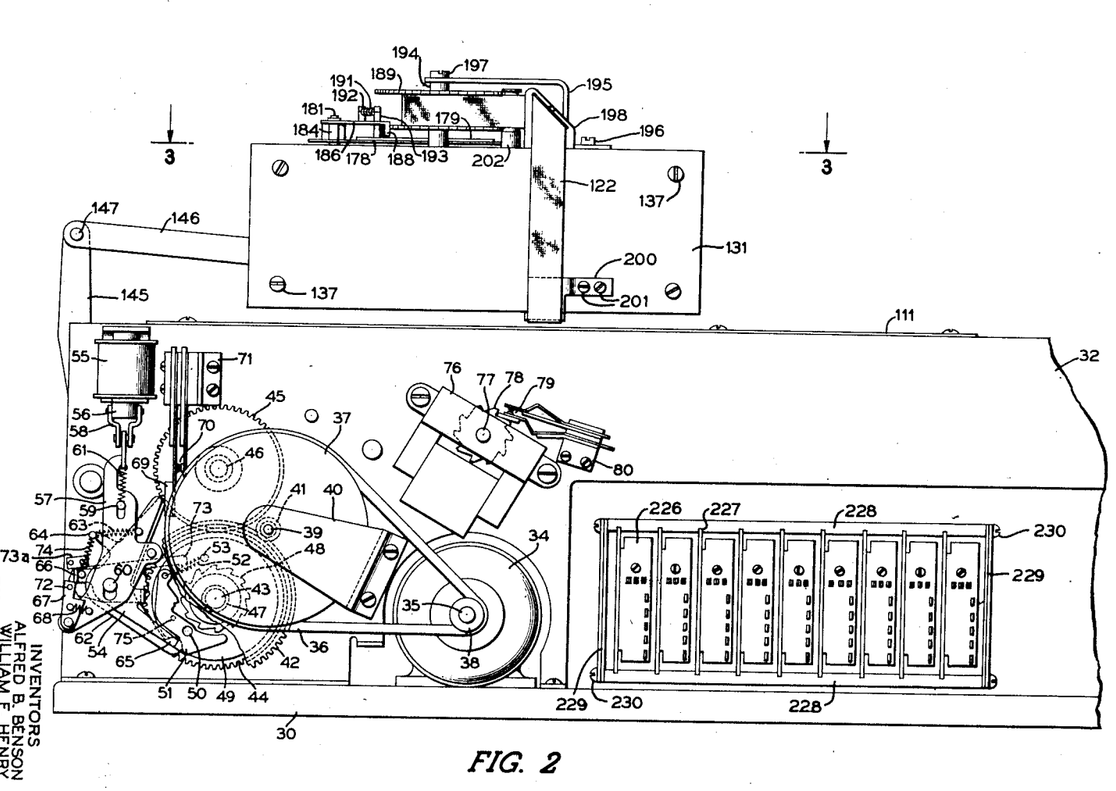
Fig. 2 is an elevational view looking at the back of the machine with the covers removed.
Figure 3:
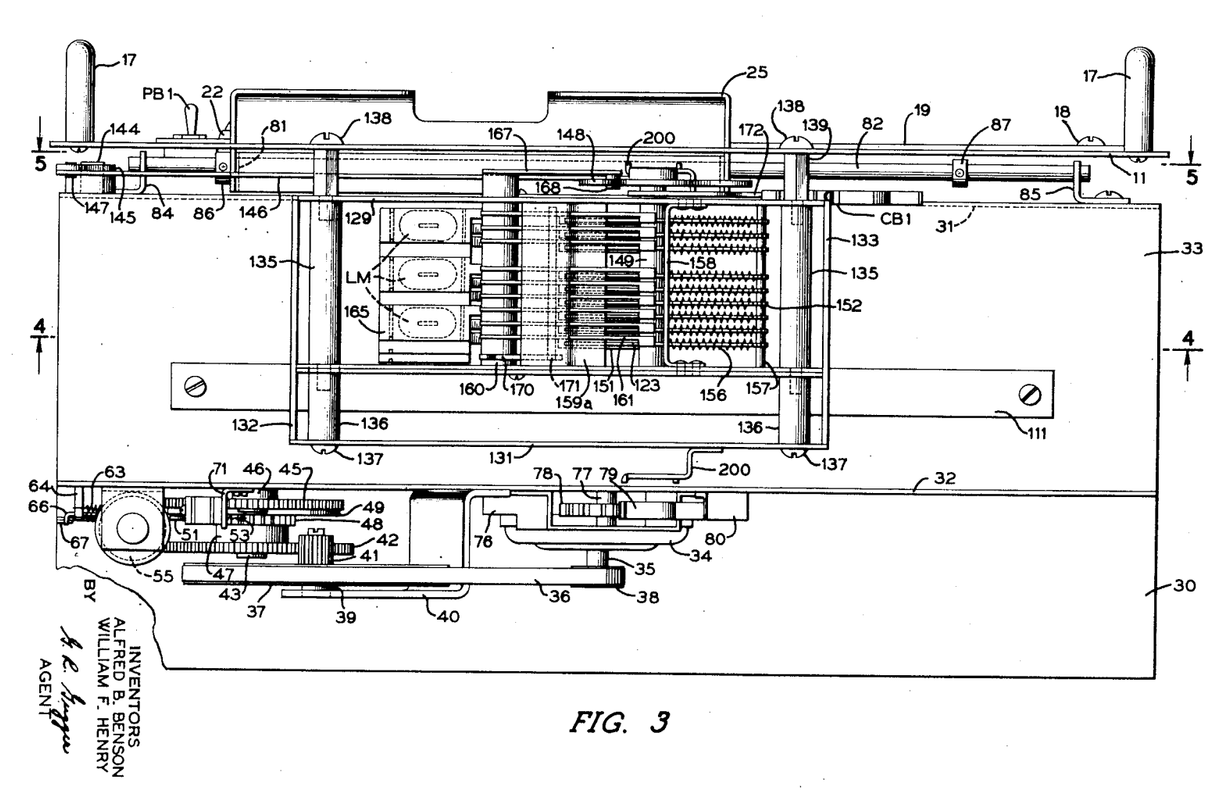
Fig. 3 is a sectional view taken on line 3—3 of Fig. 2 showing a plan view of the printing sectors.

Referring particularly to Figs. 2 and 3 the lower half of the recorder mechanism is housed within a box-like structure comprising a base plate 30, a front plate 31, a rear plate 32 and a top plate 33. Looking at the back of the machine with the rear wall 12 removed, as viewed in Fig. 2, there is shown supported on the base plate 30 a drive motor 34 having a drive shaft 35 which is adapted by means of a belt 36 and the pulleys 37, 38 to drive an auxiliary shaft 39 in a counterclockwise direction. The auxiliary shaft 39 is journaled in a bracket 40 fastened to rear plate 32. A gear 41 fastened to shaft 39 meshes with a large gear 42 rotatably mounted on a shaft 43 journaled in the front plate 31 and rear plate 32. On the shaft 43 is fastened a gear 44 which in turn meshes with a gear 45 fastened to a main cam shaft 46 journaled in the front plate 31 and rear plate 32.

The gear 42 is the driving element of a one revolution clutch and has fastened to a collar portion 47 thereof a ratchet wheel 48. Adjacent to the ratchet wheel 48 is a clutch positioning disc 49 which is pinned to the gear 44 and which pivotally supports, by means of a stud 50, a clutch engaging pawl 51. A spring 52 extending between one end of the pawl 51 and a stud 53 on the disc 49 urges the pawl clockwise for engagement with the ratchet wheel but the pawl is normally prevented from engaging said ratchet wheel by a clutch positioning lever 54 in a manner to be presently described.

To operate the clutch there is provided a solenoid mechanism which comprises a solenoid 55 suitably mounted on the rear plate 32 and having an armature 56 to which a clutch operating link 57 is connected by means of yoke member 58. The operating link 57 is mounted on studs 59, 60 for vertical movement with the solenoid armature 56. A spring 61 extending between the stud 59 and the upper end of operating link 57 maintains said link and the solenoid armature in their lower extended position (as shown in Fig. 2) when the solenoid is de-energized. Pivotally mounted on the stud 60 is the clutch positioning lever 54 and a bell crank lever 62. In the normal position of the mechanism a pair of adjacent springs 63 which extend between a pair of studs, one on the positioning lever 54 and the other on bell crank lever 62, and a stud 64 on the rear plate 32 bias said levers in a counterclockwise direction causing the rounded portion of one end of bell crank lever 62 to seat in a notch in the periphery of the clutch disc 49 and causing the extended portion 65 of positioning lever 54 to abut against the clutch pawl 51 and maintains same out of engagement with the ratchet wheel 48. An extended ear portion 66 of the positoning lever 54 also abuts against an interposer 67 which is pivotally attached to the lower extremity of the operating link 57 and spring biased against the edge of said link by a spring 68.

It may be seen that the upper extremities of the positioning lever 54 and the bell crank lever 62 lie adjacent an operating strap 69 of a pair of motor contacts 70 suitably mounted in block 71 attached to the rear plate 32. The motor contacts 70 control the operation of the drive motor 34 and are normally open to render the drive motor inoperative.

When solenoid 55 is energized, by means to be later described, armature 56 and operating link 57 will travel upward causing the interposer 67 to engage the ear 66 and drive the positioning lever 54 in a clockwise direction. As a result the upper extremity of the positioning lever will close the motor contacts 70 and the motor will operate to drive gear 42 and ratchet wheel 48. At the same time the lower extending portion 65 of the positioning lever will move away from the pawl 51 freeing said pawl for engagement with the ratchet wheel and completing the drive through the clutch disc 49, shaft 43 and gear 44 to the gear 45 and the main cam shaft 46. With the clutch disc 49 now rotating, the rounded portion on the lower extremity of said bell crank lever 62 rides onto the high portion of the periphery of the clutch disc and the bell crank level will pivot in a clockwise direction so that its upper extremity will engage the closed motor contacts 70 and maintain them closed until the clutch disc 49 has made one complete revolution.

As the operating link 57 is being pulled upward by armature 56, a pin 72 in the interposer 67 contacts the end surface of a release pawl 73 pivotally mounted on the stud 60 and biased in a clockwise direction against a stop plate 73a by a spring 74, pushing the interposer 67 counterclockwise releasing the positioning lever 54. The extended portion 65 of the positioning lever 54 is thus again placed in the path of the pawl 51 to disengage the pawl from ratchet wheel 48 after one revolution. To insure proper disengagement of the interposer 67, the release pawl 73 is rotated counterclockwise by a stud 75 on gear 44 striking the extended portion of release pawl 73. As a result of the above mechanism it can be seen that shafts 43 and 46 and the cams attached thereto will make only one revolution. If for any reason solenoid 55 should remain energized longer than it should, the operating link 57 will remain in its raised position. However, since the positioning lever 54 has returned to its normal position, the interposer 67 still in the raised position cannot engage the extended ear portion 66 of lever 54 and therefore cannot operate it to close contacts 70. Fastened on the drive shaft 43 are a pair of cams 75a and 75b (Fig. 4) which operate circuit breakers CB2 and CB3 respectively for purposes to be described in connection with the circuitry of the machine.

Referring again to Fig. 2, it may be seen that the rear plate 32 also supports a synchronous motor 76. The shaft 77 of the motor has fastened thereto a ten lobe cam 78 which will make one revolution per minute as long as power is turned on in the machine to energize the synchronous motor. The ten lobe cam 78 operates to close a pair of timer contacts 79 mounted in a block 80 which is attached to the rear plate 32. The timer contacts 79 will close ten times each minute and are provided to initiate the computing of the length of time it takes to do a production job as will be more fully described in connection with the circuitry of the machine.

Card holder carriage

Figure 4:
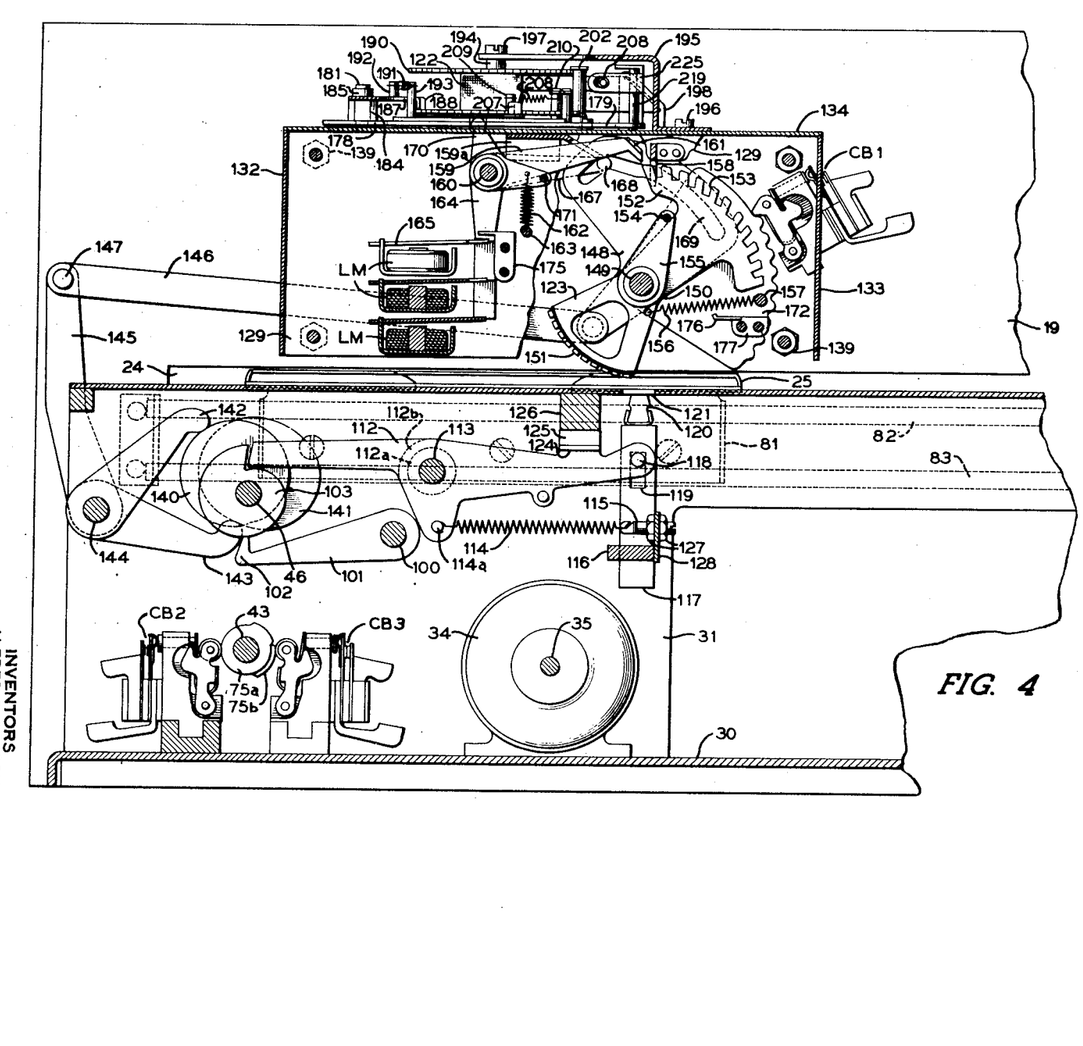
Fig. 4 is a sectional view taken on line 4—4 of Fig. 3 showing the printing mechanism.
Figure 5:
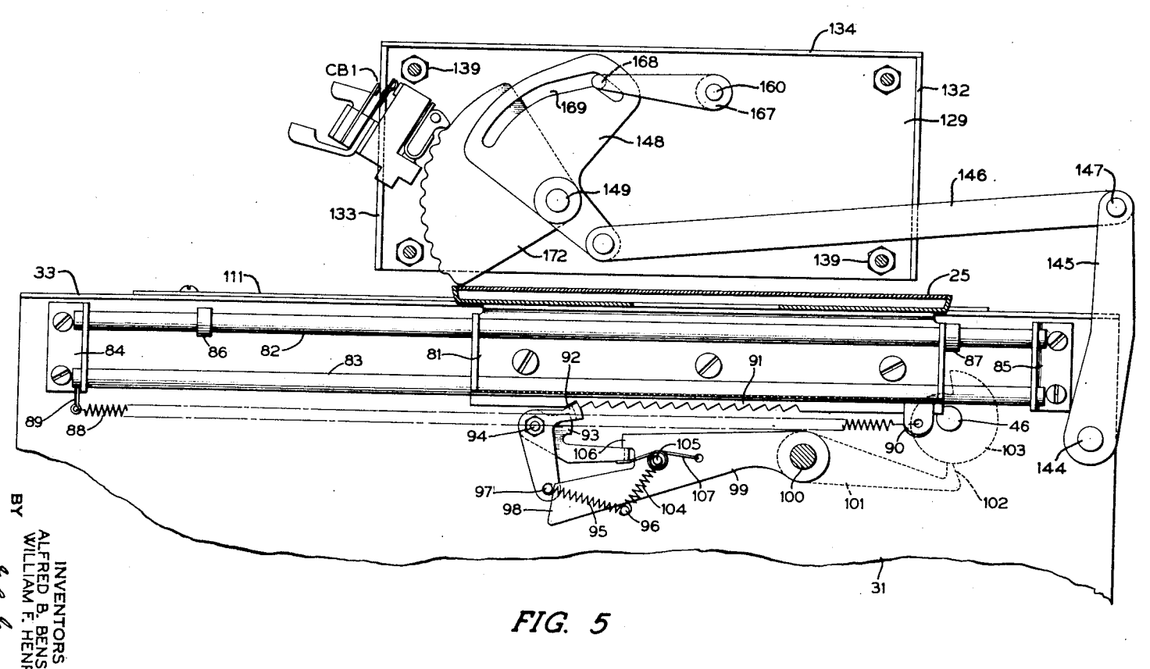
Fig. 5 is a sectional view taken on line 5—5 of Fig. 3 showing the card holder and escapement mechanism.

Referring to Figs. 3, 4, and 5, the card holder tray 25 which extends through the slot 24 in the front wall 11 of the recorder casing is shown supported on a carriage member 81 having outwardly turned sides which are slidably mounted on a pair of rods 82 and 83. The rods 82, 83 extend across the machine between the front plate 31 and the front wall 11 of the casing and are fastened in a pair of brackets 84, 85 attached to the front plate 31. A pair of stop collars 86, 87 are fastened on rod 82 to control the extent of lateral movement that may be imparted to the card holder and carriage. Looking at the front of the recorder, the carriage will be manually moved toward the right against the stop collar 87, as shown in Fig. 5, prior to the start of a run and with a new card placed in the holder. The carriage is normally urged to move to the left toward the stop collar 86 by a large spring 88 which extends between a cotter pin 89 in rod 83 and an ear 90 integral with the carriage unit. The movement of the carriage toward the left; however, is controlled by an escapement mechanism which cooperates with a rack bar 91 integral with the underside of the carriage.

The escapement mechanism comprises a pair of escapement levers 92 and 93 pivotally mounted on a stud 94. With the carriage pushed against the stop collar 87 to begin a new cycle of operation of the machine, it may be seen that escapement lever 92 will be in engagement with the last tooth in rack bar 91 due to the action of spring 95 which extends between a stud 96 on the front plate 31 and a stud 97 on the lever 92. In such a position, the stud 97 will abut against the upper part of surface 98 on the end of an actuating lever 99 fastened on shaft 100 which is journaled in the front plate 31 and rear plate 32. Also fastened on the shaft 100 is a follower arm 101 having a hook portion 102 which is urged to ride on the periphery of a cam 103 by virtue of a spring 104 which extends between the stud 96 and a stud 105 on the actuating lever 99. The cam 103 is fastened to the cam shaft 46 which, it will be remembered, makes one revolution each time that the motor contacts 70 are closed.

Figure 9:
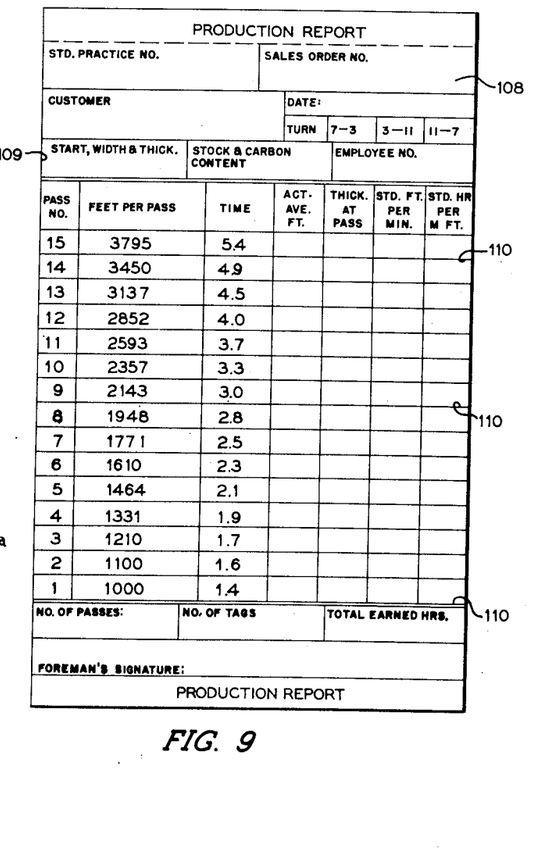
Fig. 9 is a view showing a typical production record card that would be used in the recorder.

When escapement lever 92 is in engagement with the rack bar 91 the second escapement lever 93 is held out of engagement with said bar by a nose 106 on actuating lever 99 and a spring 107 mounted on the stud 105 as shown in Fig. 5. Each time that the motor contacts 70 are closed to send the machine through a cycle of operation, cam 103 will make one revolution and as follower arm 101 rides from the low portion to the high portion shaft 100 and lever 99 will pivot in a clockwise direction allowing the surface 98 on the actuating lever to cam escapement lever 92 clockwise disengaging the rack bar. At the same time escapement lever 93 will be driven in a counterclockwise direction to engage the next tooth as the rack bar moves one space to the left. When the follower arm drops from the high portion to the low portion of cam 103, the actuating lever will pivot rapidly in a counterclockwise direction allowing escapement lever 93 to pivot clear of the rack bar and escapement lever 92 to simultaneously engage the next tooth of the bar before the bar has a chance to move. Thus, for each revolution of cam 103 the card holder will be stepped one space to the left and it will be understood that with a record card 108, as shown in Fig. 9, inserted in the card holder with edge 109 first, that each space of the carriage will move the card from one printing line to the next printing line, the printing lines being indicated as 110 on the card. The card is inserted so that edge 109 abuts against a guide plate 111 (Fig. 3) fastened on the top plate 33, said plate 111 serving to position the card and to guide same during movement of the carriage. It will be noted that in the present case there are 15 tooth spaces in the rack bar 91 and there are 15 printing lines on the card. If desired, it is possible to provide skipping of the card holder carriage by eliminating notches in the rack bar since one of the escapement levers is always in contact with the rack.

*Printing mechanism*

The printing of data on the record card is accomplished by means of a cam controlled print hammer. Referring to Fig. 4, the main cam shaft 46 supports the cam 103 which operates the escapement mechanism as just described. The cam 103 also has an associated hammer link 112 pivotally mounted on a shaft 113 which extends between the front and rear plates 31 and 32. The hammer link 112 has integral therewith a collar 112a which is pivoted on shaft 113 and joined to a second link 112b pivoted on shaft 113. The link 112 is normally urged counterclockwise against the periphery of cam 103 by a spring 114 extending between a stud 114a, connecting said links, and a threaded anchor 115 wastened to a guide member 116. The guide member 116 is fastened between the front and rear plates 31 and 32.

The two links 112 and 112b embrace a printing hammer 117 and are connected thereto by means of a pin 118 which extends through a slot 119 in the hammer. The hammer 117 is slidable in the guide member 116 and has mounted on its top edge a platen 120 which extends along an opening 121 in the top plate 33. The hammer 117 is moved upward with the platen 120 driving the record card against an inked ribbon 122 and the type sectors 123 each time that the hammer link 112 drops off the high dwell of cam 103, said cam 103 making one revolution each time that the motor contacts 70 are closed as previously described. The upward blow is cushioned by means of a shoulder 124 on the hammer links 112 and 112b contacting a rubber block 125 attached to bar 126 which extends between the front and rear plates 31 and 32. The strength of impression of the hammer may be adjusted to compensate for varying thicknesses of the record card by adjusting the threaded anchor 115 to which the tension spring 114 is attached. The lock nut 127 positions and retains the anchor in the plate 128 which forms a part of the guide member 116.

*Sector mechanism and ribbon feed*

Referring to Figs. 3 and 4, the sector mechanism is housed within a box-like structure which is supported above the top plate 33. The structure comprises a front plate 129, an intermediate plate 130, a rear plate 131, two side plates 132, 133 and a top plate 134. Plates 129, 130 and 131 are positioned by threaded spacers 135 which screw into threaded spacers 136. Spacers 136 are fastened to the rear plate 131 by screws 137 and the entire structure is supported on the front wall 11 of the recorder casing by means of screws 138 and threaded spacers 139 which in turn screw into the spacers 135.

The operation of the printing sector mechanism is under control of a pair of complementary cams 140 and 141 (Fig. 4) fastened on the main cam shaft 46 of the recorder. When shaft 46 is caused to make a revolution, as previously described, said complementary cams will act upon a pair of associated follower arms 142 and 143 fastened on a shaft 144 journaled in the front and rear plates 31 and 32 causing said shaft 144 to oscillate, first in a clockwise direction and then in a counterclockwise direction. Fastened to the shaft 144 is a lever 145 which is connected to a driving link 146 by means of a stud 147. The other end of driving link 146 is fastened to a cam member 148 which is fastened on a sector shaft 149 journaled in the front and intermediate plates 129, 130 and as a result shaft 149 will oscillate with shaft 144.

Pivotally mounted on shaft 149 is a series of nine double sector plates 150, each having a lower sector 123 containing a series of ten type elements 151 for printing the numerals 0–9 inclusive. The sector plates are arranged in a group of three and a group of six, the group of three being used to indicate the elapsed time of a production run in tenths of minutes up to 99.9 and the group of six being used to indicate quantity of units production or the like up to 999,999. The upper sectors 152 each contain a series of ten ratchet tooth spaces 153 which are used, as will presently be seen, to selectively position a desired type element 151 at the printing station above platen 120. In normal position, the sector plates are urged counterclockwise against a bail 154 fastened to a bail link 155, which is fixed to shaft 149, by means of springs 156 extending between the sectors and a stud 157 fastened between the front and intermediate plates 129 and 130. It may be seen, then, that during the rotation of main cam shaft 46, the link 146 and cam member 148 will rotate shaft 149, bail link 155 and the sector plates first in a counterclockwise direction and then in a clockwise direction, the ratchet sectors 152 moving through slots in a guide plate 158 fastened between the front and rear plates 31 and 32.

The mechanism for selectively positioning the sectors for printing comprises a series of nine latch levers 159 pivotally mounted on a shaft 160 journaled in the front and intermediate plates 129 and 130. The levers are positioned along the shaft 160 by a comb member 159a so that the hooked end 161 of each one can act on the ratchet teeth of a corresponding sector and they are normally urged in a clockwise direction for engagement with the ratchet teeth in the sectors by springs 162 extending between the levers and a stud 163 fastened between the front and intermediate plates 129, 130. The latch levers 159 have downwardly extending portions 164 of varying lengths which are notched at the bottom and which are normally latched against the armatures 165 of a group of nine latch magnets LM mounted in staggered relationship in groups of three each. In the latched position, as shown in Fig. 4, the hooked ends 161 of the latch levers are clear of the ratchet teeth in the upper sectors 152.

Fastened on the shaft 160 is an arm 167 having a stud 168 which rides in a cam slot 169 in the cam member 148. The cam slot 169 is arranged so that the oscillation of shaft 149 and the cam member 148 is imparted to shaft 160 through arm 167. Also fastened on the shaft 160 is a bell crank lever 170, the lower arm of which has fastened thereto a stud 171 which extends underneath all of the latch levers 159. The upper arm of bell crank lever 170 extends through a slot in top plate 134 and is used to actuate the ribbon feed mechanism in a manner to be described.

The operation of the selector mechanism is under control of a circuit breaker cam 172 fastened on shaft 149 and having a series of nine lobes on its periphery which function to open and close a pair of circuit breaker contacts mounted in a conventional circuit breaker unit CB1 attached to the front plate 129. As will be more clearly understood in connection with the circuit description of the machine, the counters in the recorder unit receive count pulses and time pulses indicative of the work being done on the production machine. When the recorder unit is conditioned to take a print cycle, the main cam shaft 46 will make one revolution, as previously described, during which time the sector shaft 149 will be driven first in a counterclockwise direction (Fig. 4) and then in a clockwise direction through the driving link 146 and the cam member 148. As shaft 149 moves counterclockwise, the bail link 155, sector plates and circuit breaker cam 172 will also move counterclockwise with the circuit breaker cam closing contacts CB1 to direct impulses to the counters in the recorder unit. Each sector will continue to follow the bail link 155 until its related latch magnet LM receives an impulse from the related counter, which occurs when said counter reaches zero, as will be shown later in connection with the circuit diagram. Energization of a latch magnet LM will draw the related magnet armature 165 downward unlatching the latch lever 159. Latch lever 159 will then be spring biased clockwise into engagement with the proper notch in the related ratchet sector 152 thereby stopping further movement of the sector plate with the type element 151 in position for printing the number which had been stored in the corresponding counter, as will appear more fully when the circuit diagram is described.

It will be noted that as cam member 148 moves counterclockwise, arm 167 will cause shaft 160 to rotate clockwise carrying with it bell crank lever 170. As a result stud 171 on bell crank lever 170 is moved away from the latch levers 159 leaving them free to be pivoted into engagement with the ratchet sectors. A slotted guide bracket 175 is fastened between the front and intermediate plates 129, 130 to guide the latch levers 159.

After the bail link 155 reaches the limit of its counterclockwise movement and all of the sectors have been positioned, the printing hammer 117 is tripped off, as previously described, and a recording is made. Any of the sector plates that were not required to be stopped by the latch levers 159 will be stopped by projecting fingers 176 on a stop bracket 177 fastened between the front and intermediate plates 129 and 130. At the end of the printing cycle, the complementary cams 140 and 141 will cause the sector shaft 149 to commence rotating in a clockwise (Fig. 4) direction. As cam member 148 begins to rotate clockwise, arm 167 will pivot shaft 160 counterclockwise and the stud 171 on bell crank lever 170 will lift all of the latch levers clear of the ratchet teeth on the sectors 152. The bail link 155 will restore all of the sector plates back to their home position and the shaft 149 will carry the circuit breaker cam 172 back to its home position. The latch levers 159 latched back on the armatures 165 of the latch magnets LM when they were pivoted clear of the ratchet teeth in the sectors.

Figure 6:
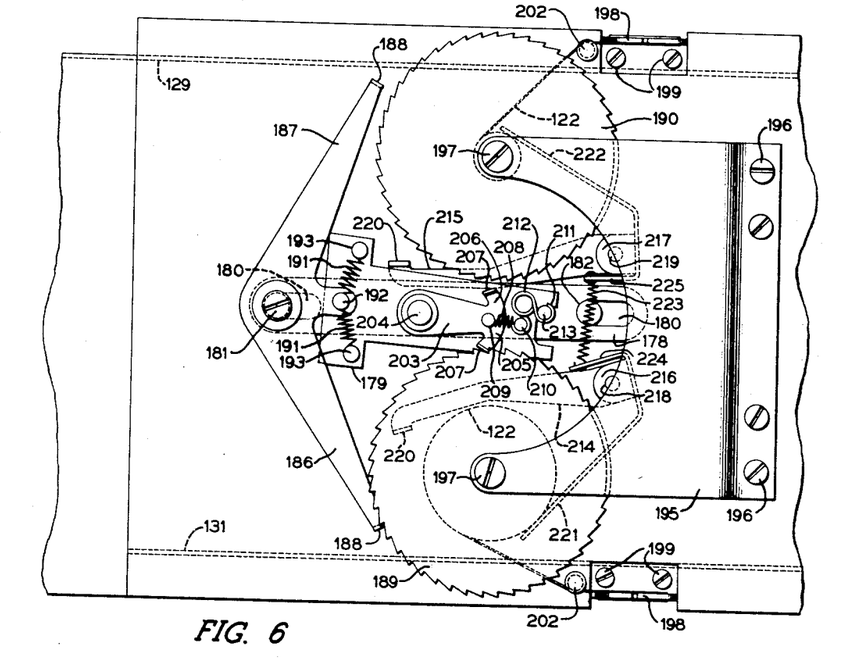
Fig. 6 is a partial plan view of the recorder with the covers removed showing the ribbon mechanism.

The ribbon mechanism, as shown in Figs. 4 and 6, is mounted on the top plate 134 and is operated by the upper arm of the bell crank lever 170 which is oscillated during the printing cycle as previously described. The extremity of the upper arm of bell crank lever 170 is in the form of a ball which extends up through an opening in the top plate 134 and through openings in a support plate 178 and a ribbon reversing plate 179. The support plate 178 is provided with a slot 180 in each extremity thereof and is mounted for reciprocation on a shouldered screw stud 181 and a stud 182 fastened to the top plate 134. The screw stud 181 extends upwardly and has assembled thereon a spaced nut 184. Loosely clamped on the spacer nut 184 by means of lock nut 185 is a wing-shaped member having two detent arms 186, 187. Each detent arm has a downwardly extending ear 188 adapted to engage the toothed wheel portion of associated ribbon spools 189 and 190. As will be understood later, the wing-shaped member, under the influence of springs 191 fastened between a stud 192 on said member and studs 193 on the reversing plate 179, will be pivoted about screw stud 181 to effect the detenting of the proper ribbon spool.

The ribbon spools 189, 190 are loosely mounted on a pair of studs 194 fastened in the top plate 134. Over the ribbon spools extends a retaining bracket 195 which is fastened to the top plate 134 by screws 196 and to the studs 194 by screws 197. The ribbon 122 is wound back and forth between the two spools 189, 190 by means to be presently described, and is guided along the front and rear plates 129 and 131 of the sector mechanism and across the bottom of same between the type elements 151 and platen 120 by means of a pair of slotted guide brackets 198 fastened to the top plate 134 by screws 199 and a pair of guide brackets 200 (Fig. 2) attached to the front and rear plates 129 and 131 by screws 201. A guide post 202 is provided near each guide bracket 198 to guide the ribbon into same.

The means for feeding the ribbon comprises a feed pawl 203 pivoted on the reversing plate 179 by means of a stud 204 fastened to the support plate 178. The pawl 203 has two arms 205, 206 each one of which extends outwardly toward one of the ribbon spools 189, 190, each of said arms having an upwardly extending ear 207 for engagement with the lower toothed wheel portion of its associated ribbon spool. The feed pawl 203 is normally retained in a fairly fixed position on the reversing plate 179 by means of a spring 208 which extends between a stud 209 on the feed pawl and a stud 210 fastened on plate 179. The reversing plate 179 is free to pivot about the stud 204 and, as shown in Fig. 6, the plate can be biased either in a clockwise or counterclockwise direction from a medial position between the ribbon spools, depending on the direction the ribbon is feeding, by means of a spring 211 which is coiled around the stud 210, formed into a loop as indicated at 212 and then coiled around a stud 213 fastened on support plate 178. With plate 179 biased clockwise, as shown in Fig. 6, the ear 207 of feed pawl arm 205 will be in engagement with the lower toothed wheel portion of ribbon spool 189 and it can be seen that as the support plate 178 and ribbon reverse plate 179 reciprocate the feed pawl 203 will rotate the spool 189 one or two teeth at a time in a clockwise direction thus, winding the inked ribbon 122 around ribbon spool 189. With the ribbon feed mechanism in position to drive spool 189, studs 193 on plate 179 are moved clockwise with respect to pivot 204 allowing springs 191 to bias the wing-shaped member in a counterclockwise direction so that the ear 188 on detent arm 186 can coact with the toothed portion of ribbon spool 189 to detent same.

The ribbon reversing mechanism comprises a pair of actuating arms 214 and 215 having bracket portions 216 and 217 respectively, which are pivotally mounted on studs 218 and 219 fastened on the top plate 134. The actuating arms 214, 215 extend between the upper and lower toothed wheel portions of the ribbon spools 189, 190, respectively, and each arm has an upwardly extending ear 220 on its extremity which is adapted to strike against the edge of reverse plate 179 as will be presently seen. Integral with the bracket portions 216, 217 are arm members 221 and 222, respectively. The arm members 221, 222 extend between the upper and lower toothed wheel portions of the ribbon spools 189, 190, respectively, and each of said arm members is urged to bear against the ribbon 122 wound on its associated spool by means of a spring 223 which is connected between bent portions 224 and 225 of said arm members.

Looking at Fig. 6 then, which shows the feed pawl 203 in position to rotate ribbon spool 189 to wind the ribbon thereon, it can be seen that as the amount of ribbon on spool 189 increases the arm member 221 will be pivoted in a counterclockwise position thus drawing the actuating arm 214 and its ear 220 away from the reversing plate 179. By the same token, as the amount of ribbon on spool 190 decreases the arm member 222 will pivot counterclockwise driving the actuating arm 215 and its ear 220 toward the edge of reversing plate 179. As the ribbon on spool 190 nears the end, the ear 220 on actuating arm 215 will strike the edge of reversing plate 179 forcing said plate to pivot counterclockwise about stud 204. When plate 179 swings past the line of centers between studs 204 and 213, coil spring 211 becomes effective to snap the plate 179 and feed pawl 203 towards the ribbon spool 190 until the pawl engages the toothed wheel portion of the spool 190. As a result the reciprocating drive is now to ribbon spool 190 and the feed of the ribbon has been reversed. Studs 193 on the reversing plate have now been moved in a counterclockwise direction allowing springs 191 to pivot the detent arm 187 into engagement with the toothed wheel portion of ribbon spool 190 to detent same. When each ribbon spool becomes empty, the reversing mechanism will operate as just described to reverse the ribbon feed.

*Counters*

The counting mechanism of the recorder comprises a series of nine counter units 226 mounted in a vertical position in the machine as shown in Fig. 2. As is well known, to form a multidenominational amount-receiving accumulator a plurality of such units are mounted side by side and electrically interconnected in a manner to be described so that units carries or transfers may be effected from each lower order accumulator wheel to the next higher order wheel. These counter units are mounted on individual plates 227 and are slidably retained in position within the machine by a pair of notched bars 228 attached to frame members 229 of the machine by screws 230.

The counters 226 are of the type which are operable step by step by successive electrical impulses and are a modified form of the counter shown in U. S. Patent 2,480,744 to C. D. Lake et al. As was previously mentioned, the present counters operate in a novel manner to control the positioning of the type sectors as will be described later in the circuit description of the machine.

Figure 7:
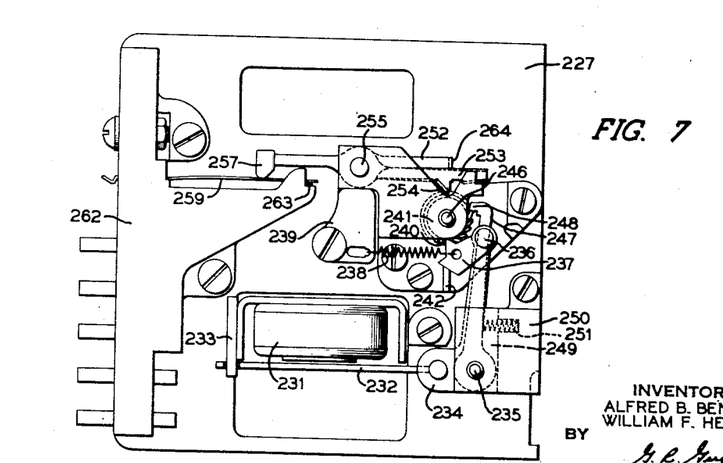
Fig. 7 is a view showing the construction of one of the counters.

Referring to Fig. 7, which is a view showing the construction of one of the counter units 226, there is shown, carried by the plate 227, a "rock" magnet 231 having an armature 232 which is pivoted to a frame member 233. The right-hand end of the armature 232 is connected to an upstanding lever 234 which is pivoted on a stud 235. Pivoted on a stud 236 carried by the lever 234 in an operating pawl 237 and said pawl is urged by a spring 238 which is extended from the pawl 237 to a bracket 239 fastened on plate 227, into engagement with a tooth 240 of a ratchet wheel 241 (see Fig. 8 also).

It is evident that when the armature 232 is attracted by the core of the energized "rock" magnet 231 it will rock the lever 234 clockwise about its pivotal stud 235 and pawl 237 will be moved to the right under the now idle ratchet wheel 241 to engage the next tooth to the right thereof. In such position the pawl 237 is in a position to rotate the ratchet wheel 241 clockwise one ratchet tooth when the magnet 231 is de-energized. When magnet 231 is deenergized the tension on spring 238 will rock the lever 234 counterclockwise to effect the one-tooth rotation of the ratchet wheel 241 with pawl 237 striking against a stop member 242. In this manner a unit is entered for each reciprocation of lever 234.

The accumulator wheel assembly for each order consists of an "add" ratchet wheel 241, a ratchet wheel 243 (Fig. 8) which is associated with the detent mechanism to be described, and two control cams 244 and 245 associated with the units carry mechanism. By any suitable means the ratchet wheels 241, 243 and two cams 244 and 245 are fastened to a shaft 246 which is suitably journaled in the plate 227.

Figure 8:
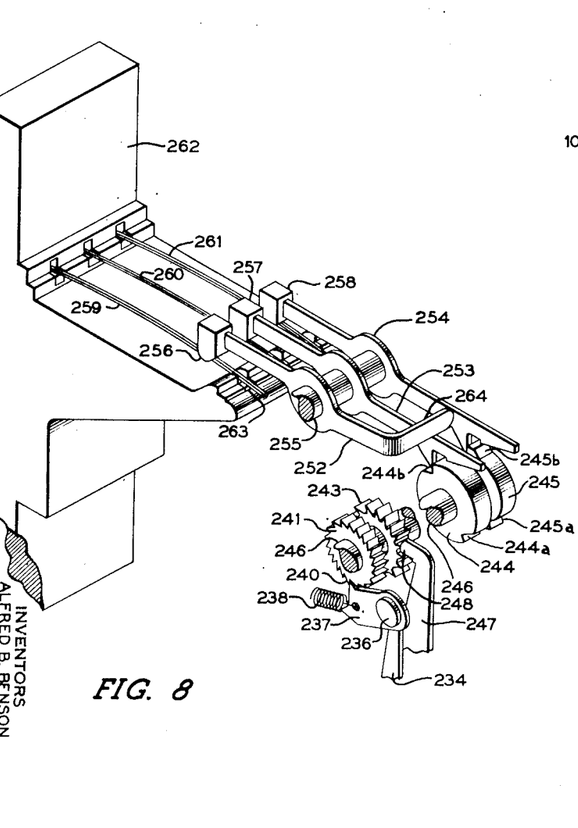
Fig. 8 is an isometric view showing the contacts and operating mechanism therefore of a counter.

The detent mechanism consists of a detent lever 247 which is pivoted on the stud 235 and which has a hook portion 248 which rides over the teeth on ratchet wheel 243 whenever said wheel is rotated clockwise. However, due to the cut of the teeth on ratchet wheel 243 the hook portion 248 of lever 247 will prevent the ratchet wheel 243 from turning counterclockwise and consequently shaft 246, ratchet 241 and cams 244, 245 are prevented from retrograde motion in a counterclockwise direction. The levers 234 and 247 are free to pivot within grooves 249 in a block assembly 250 which serve to space the levers apart. A spring 251 mounted in the block assembly 250 bears against the detent lever 247 and maintains the hook portion 248 of the lever in engagement with the ratchet wheel 243.

The cams 244 and 245 operate a series of three levers 252, 253 and 254 which are pivoted on a rod 255. Carried on the left ends of the levers 252, 253 and 254 are insulating blocks 256, 257 and 258, respectively, which normally overlie a series of spring contact blades 259, 260 and 261, respectively, mounted in frame member 262. The cams 244, 245 are shown in the position they occupy whenever the accumulator ratchet wheel 241 stands at 0 and in this position the contacts 259, 260 and 261 will be open. Whenever the levers 252, 253 or 254 are pivoted counterclockwise the associated spring contact blades will be pressed against terminal blocks 263 to complete circuits which will be presently described.

Referring to Fig. 8 cam 244 is provided with notches 244a and 244b which are effective at each half revolution of the accumulator wheel when it represents 0 to allow lever 253 to rock clockwise to open contacts 260, said contacts 260 being closed at all other times. Contacts 259 are similarly operated by means of the bent portion 264 of lever 252 overlying lever 253 for operation therewith. Contacts 260 are used to clear the counter, as will be described, and the contacts 259 are used to control the indicating lights 22 and 23. Cam 245 is provided with projections 245a and 245b which are alternately effective at each half revolution of the accumulator wheel, when it represents 9, to rock the lever 254 counterclockwise and close the 9's contact 261. As a result a units carry entry is made to an accumulator wheel when the next lower order wheel passes from 9 to 0, by circuitry to be described.

*Electrical connections*

Figure 10A:
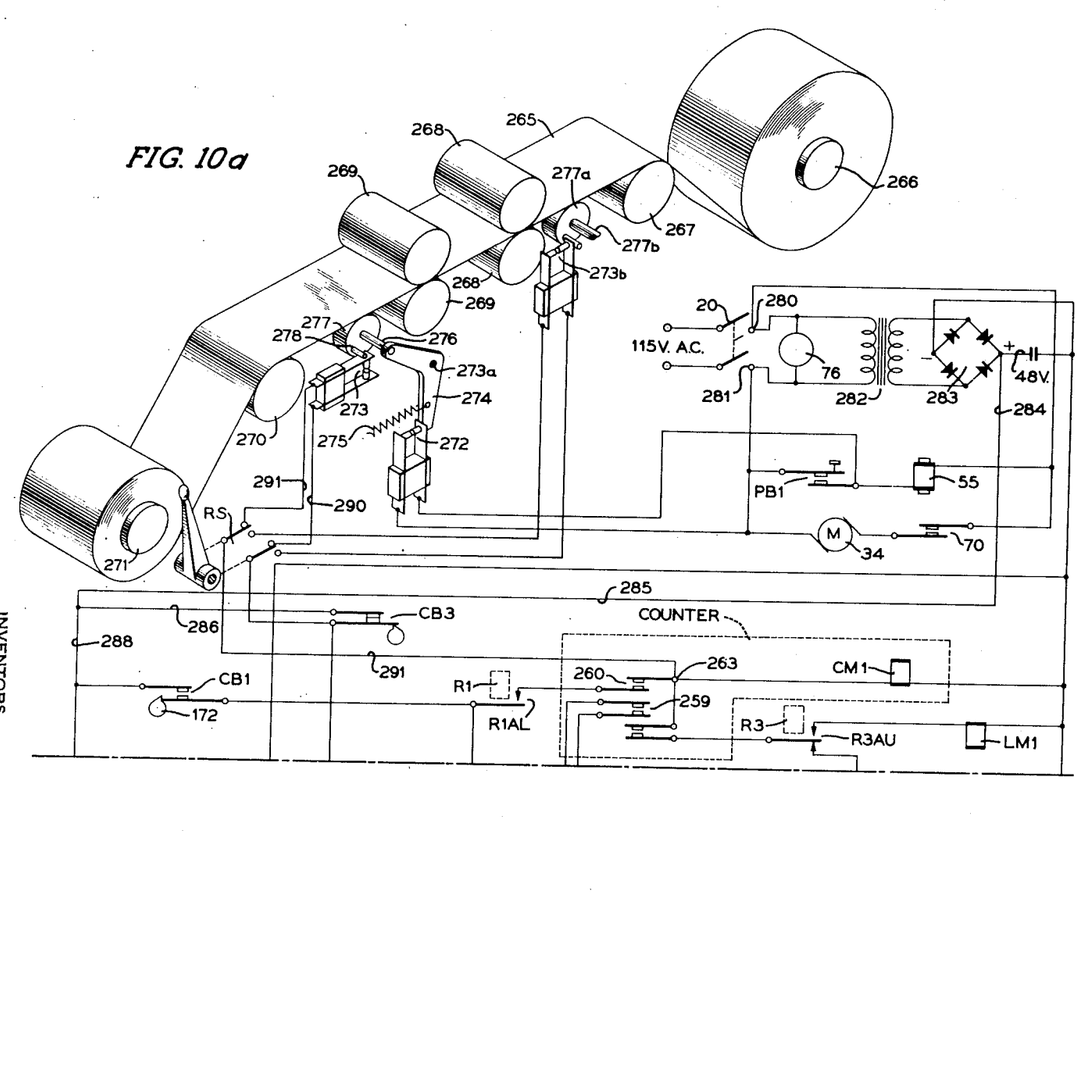
Figs. 10a and 10b taken together constitute a wiring diagram of the machine.
Figure 10B:
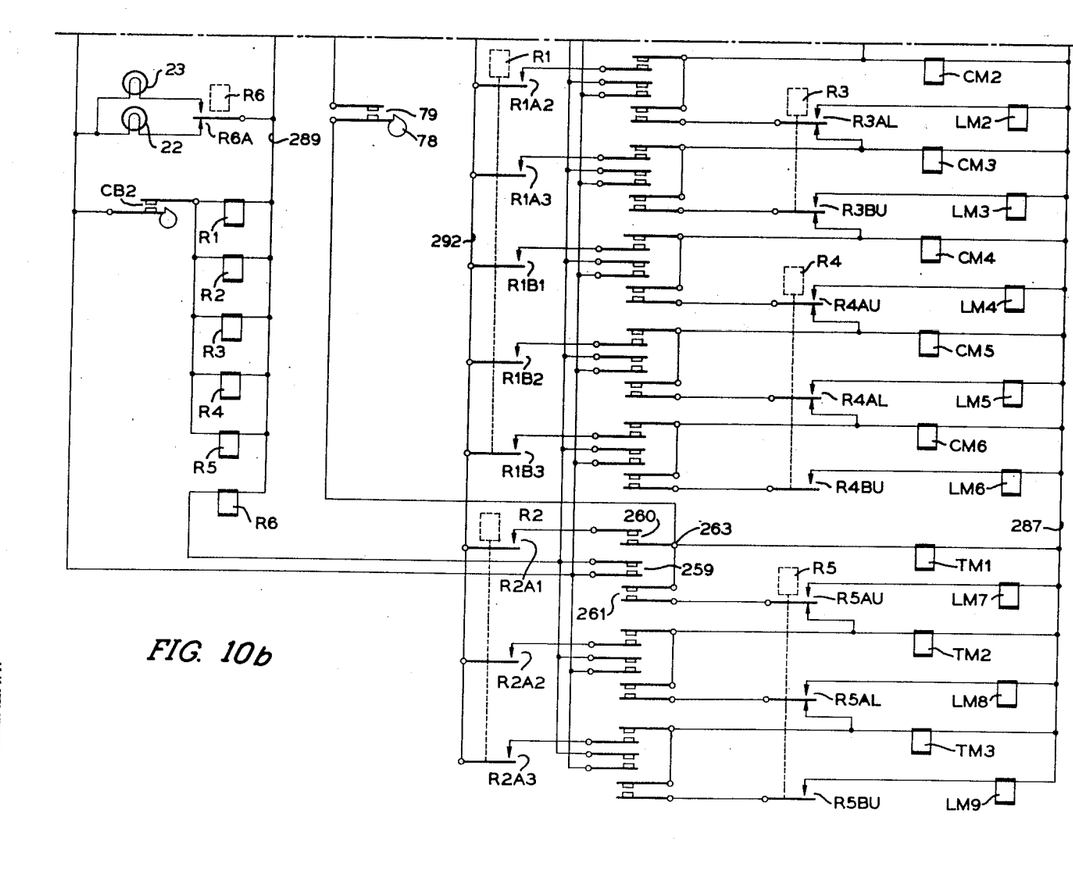

The electrical connections of the machine are shown in Figs. 10a and 10b. Referring to Fig. 10a, it will be noted that these connections are shown along with a schematic showing of a strip steel rolling operation of the type presently used by mills for reducing strip steel stock to a thickness suitable for the manufacture of razor blades or the like. It is to be understood that this showing is merely illustrative of one application of the present recording device.

In the illustrative embodiment of the invention approximately 1000 feet of strip steel stock 265 having a thickness of .100 of an inch is provided, wound on a supply roll 266. The free end of the stock is extended over a guide roller 267, between two sets of opposing reduction rolls 268, 269, over a second guide roller 270 and is fastened to a take-up roll 271. Suitable means are provided, which form no part of the present invention and therefore are not shown, for driving said rolls first in one direction and then in the opposite direction so that substantially all of the strip stock is reciprocated back and forth between the reduction rolls 268 and 269. The movement of substantially all of the strip stock 265 in one direction, that is, from either the supply roll 266 to the take-up roll 271 or vice versa is hereinafter called one pass and it has been determined that it takes approximately 15 passes to reduce 1000 feet of the strip stock 265 down to a thickness of .017 of an inch which is suitable for the manufacture of razor blades. For such an application it is to be assumed that the rolls are feeding the strip stock at approximately 700 feet per minute. At the end of a run the extreme ends of the stock which were fastened to the rolls 266, 271 and which did not get reduced are sheared off.

As shown in Fig. 10a, the recorder device is electrically connected with the operation of the mill rolls through a run-out contact switch 272 and count contacts 273 and 273b which are mounted by any suitable means near the path of the strip stock 265. The recorder unit itself, of course, may be located quite a distance away from these contacts. Pivotally mounted at 273a adjacent the run-out contacts 272 is a bell crank lever 274 which is normally urged in a clockwise direction by a spring 275 so that the lower arm of the bell crank lever abuts against a contact strap of the run-out switch contacts 272. Attached to the end of the upper arm of the bell crank lever 274 is a stud 276 which underlies the strip stock 265 and which carries a rotatable count wheel 277. With strip stock extending between the supply roll 266 and the take-up roll 271, the wheel 277 will be urged by spring 275 against the underside of the strip stock and in this position the bell crank lever 274 will not be pivoted clockwise enough to effect the closure of run-out contacts 272. It is evident, then, that should the strip stock break or be run-out the run-out contacts 272 will be closed by the bell crank lever 274 and, as will be presently seen, closure of contacts 272 will initiate a print cycle in the recorder.

The count wheel 277 is rotated by the strip stock 265 at the rate of one revolution for every foot of strip stock fed and carries a stud 278 which is adapted to effect the closure of the count contacts 273 once for every revolution of said count wheel 277. In this manner the counters in the recorder are impulsed once for every foot of strip stock fed and this serves as a basis for recording on the record card 108 the number of feet of stock fed per pass as shown in Fig. 9. A second count wheel 277a is positioned on the other side of the reduction rolls 268, 269 and is pivoted on a stationary stud 277b. Count wheel 277a similarly operates count contacts 273b which are effective when the strip stock feeds from left to right to enter counts into the counters. The figures shown in Fig. 9 are representative of the results obtained in the present operation wherein the strip stock increases in length by about 10% for each pass through the reduction rolls. This increase in length will be accompanied by a little under .006 of an inch decrease in thickness of the strip stock per pass.

When the power switch 20 (Fig. 10a) of the recorder is closed a circuit will be completed from one side of a 115 volt A. C. supply (terminal 280) through the synchronous motor 76 to the other side of the power supply (terminal 281). Closure of switch 289 also supplies power to the primary of a transformer 282, the secondary of which furnishes power to a rectifier 283. The rectifier 283 is required to furnish 48 volts D. C. for operation of the counter magnets, latch trip magnets and relays of the recorder.

Energization of the synchronous motor 76 causes the ten lobe cam 78 fastened to the synchronous motor shaft to revolve thus closing the timer contacts 79 each tenth of a minute. It is to be assumed that the mill rolls are started into operation simultaneously with the recorder unit because the timer contacts are used to compute the elapsed time of a run. It should also be mentioned that only six of the nine counter units 226 are used to accumulate the number of feet per pass. The remaining three are used to compute the elapsed time in minutes and tenths of minutes and their rock magnets are referred to hereinafter as TM-1, 2 and 3 while the rock magnets of the other six counters are referred to as CM-1 through CM-6. Each tenth of a minute then, a circuit will be completed from the plus 48 volt terminal (Fig. 10a), wire 284, wire 285, wire 286, CB3 normally closed, timer contacts 79 (Fig. 10b), counter terminal 263, through the counter magnet TM-1 and wire 287 to the minus 48 volt terminal. When the first impulse is received by counter magnet TM-1 the counter leaves its 0 position and its indicating light control contacts 259 and its reset contacts 260 are closed as previously described.

When the recorder was turned on and before the first impulse was received by a counter, a circuit was completed from the plus 48 volt terminal, wire 285, wire 288, through the green indicator light 22 (Fig. 10b), R6A contacts normally closed, wire 289 and wire 287 to the minus 48 volt terminal thus energizing the green light to indicate to the operator that all of the counters are cleared. The first impulse to counter magnet TM-1, however, closes its contacts 259 and a circuit is completed from the plus 48 volt terminal (Fig. 10a), wire 284, wire 285 wire 288, contacts 259 for counter TM-1 now closed (Fig. 10b), relay R6, wire 289, and wire 287 to the minus 48 volt terminal. Transferring of the relay contacts R6A extinguishes the green light 22 and the circuit previously traced to energize the green light is now completed through the red light 23 to indicate that a count has been entered into a counter.

The counter magnet TM-1 keeps on receiving timing pulses as the production run continues and when the ninth pulse is received the carry contacts 261 are closed in the manner previously described and the next successive pulse or tenth pulse will be transmitted to the counter magnet TM-2 through the normally closed R5AU contacts to effect a carry circuit to the next higher order. This same impulse also energizes the counter magnet TM-1 causing that counter to roll to 0 position. The counter under control of magnet TM-2 now stands at 1 and the counter under control of magnet TM-1 stands at 0 to register the value of 10. Carry is effected between counter magnet TM-2 and counter magnet TM-3 in the same manner.

At the same time that TM-1, TM-2 and TM-3 are receiving timing impulses, the counter magnets CM-1 through CM-6 are receiving impulses from the count contacts 273 and 273b on the production machine to register the number of feet of strip stock being fed through the mill rolls. When the stock is feeding from right to left this circuit extends from the plus 48 volt terminal, wire 284, wire 285, wire 286, CB3 contacts normally closed, mill reversing switch RS closed in the upper position, wire 290, count contacts 273, wire 291, switch RS, counter terminal 263, through counter magnet CM-1 and wire 287 to the minus 48 volt terminal. The carry and control circuits for counters CM-1 through CM-6 are the same as those previously described for counters TM-1 through TM-3.

At the end of each pass the mill operator reverses switch RS to change the rotation of the mill rolls. On a pass from left to right the count circuit will be through the lower position of switch RS and the count contacts 273b. It is evident that the count circuit will alternate between contacts 273 and 273b as the direction of feed changes.

At the end of each pass the mill operator brings the mill rolls to a stop and a switch PB1 in the recorder is manually closed to initiate a print cycle to record on the record card the number of feet of stock fed per pass and the elapsed time in minutes as shown in Fig. 9. Although not shown it is to be understood that suitable contacts may also be provided on the mill so that when the mill operator reverses the rotation of the rolls by reversing switch RS, the recorder will go through a print cycle in the same manner as though switch PB1 were closed.

When the switch PB1 (Fig. 10a) is closed a circuit is completed from terminal 281 of the 115 volt supply, switch PB1, solenoid 55 and back to terminal 280 of the power supply. Energization of solenoid 55 causes the closure of the motor contacts 70 as previously described and a circuit is completed from terminal 281 of the 115 volt supply, the drive motor 34, motor contacts 70 and back to terminal 280 of the power supply. The drive motor now operates and by means of the one revolution clutch mechanism the main cam shafts 43 and 46 will make one revolution as previously described. The machine cams then operate to start the print sectors 150 and CB1 cam 172 into operation, the card receiver is conditioned to advance one position and the ink ribbon is advanced.

The circuit breaker CB3 fastened to the shaft 43 which is now making one revolution opens its normally closed CB3 contacts and prevents any further count impulses from entering into the counters of the recorder from either the count contacts 273, 273b or the timer contacts 79. Also the circuit breaker CB2 fastened to the shaft 43 closes its normally open CB2 contacts and a circuit is completed from the plus 48 volt supply, wire 285, wire 288, CB2 (Fig. 10b), relays R1 through R5, wire 289 and wire 287 back to the minus 48 volt supply. Simultaneously CB1 is successively opened and closed by cam 172 and circuits are completed from the plus 48 volt source, wire 285, wire 288, CB1 contacts, contacts R1A1, reset contacts 260 closed for all counter positions except 0, counter terminal 263, counter magnet CM-1 and wire 287 back to the minus 48 volt supply. As a result pulses are fed into counter CM-1 until the counter reaches zero. When the 9's contact 261 for counter CM-1 closes, the circuit just traced extends from the counter terminal 263 of counter CM-1, 9's contacts 261, contacts R3AU now transferred, through latch magnet LM-1 and wire 287 back to the minus 48 volt supply. Energization of the latch magnet LM-1 will stop the print sector associated with counter CM-1 in position to print the number entered into that counter. As viewed in Fig. 4, when the sectors move counterclockwise the type elements are passing the printing platen in the order of 9, 8, 7, 6, 5, 4, 3, 2, 1 and 0 and in timed relationship with this movement, the counters are being impulsed in the order of 1, 2, 3, 4, 5, 6, 7, 8, and 9.

It is evident that the impulses from CB1 are transmitted over a wire 292 and through contacts R1A1 through R1A3, contacts R1B1 through R1B3, contacts R2A1 through R2A3 and through all the reset contacts 260 to enter complement values in all of the counters and to effect the energization of the latch magnets LM-1 through LM-9 to position the print sectors. After the print sectors are positioned the print hammer is tripped and a registration is made such as is shown in the column for pass 1 on the record card.

When all of the counters have been cleared in the manner just described, the CB-3 contacts are again closed and the circuits are again established for the next counting operation. The control contacts 259 of the counters will also open deenergizing relay R6 transferring the contacts R6A and causing the green light 22 to illuminate indicating that the recorder is ready for another cycle of operation.

It will be noticed that the run-out switch contacts 272 at the mill (Fig. 10a) are wired to the solenoid 55 so that closure of same on a run-out operation of the strip stock will initiate a print cycle in the recorder in the same manner that the manual closure of the PB-1 contacts did.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a recording device of the class described, printing instrumentalities having a series of number types thereon, means for moving said printing instrumentalities to present said types sequentially at a printing position, an impulse emitter, means for moving said impulse emitter in synchronism with said printing instrumentalities, accumulating devices having denominational elements, electro-magnetic means impulsed by said emitter for advancing said elements, means for arresting the movement of said printing instrumentalities, and means on each of said accumulating devices and effective when each accumulating device reaches a predetermined value for initiating operation of said arresting means to stop said printing instrumentalities.

2. In a recording device of the class described, printing instrumentalities, accumulating devices having denominational elements and electromagnetic means for advancing said elements, means for impulsing said electromagnetic means to effect normal counting operations, means for operating said printing instrumentalities, an impulse emitter, means for moving said impulse emitter in synchronism with said printing instrumentalities, said emitter adapted during movement to impulse said electromagnetic means, means for initiating operation of said operating means, means on each of said accumulating devices for interrupting the emitter impulses to the electromagnetic means thereof as each accumulating device reaches zero, means for arresting the movement of said printing instrumentalities, other means on each of said accumulating devices and effective when each accumulating device reaches zero for initiating operation of said arresting means to stop said printing instrumentalities, and control means for disabling said normal counting operations during the operation of said impulse emitter.

3. A device as in claim 2 further characterized by a second control means for disabling said operating means during normal counting operations.

4. In a recording device of the class described, a rockshaft, a type sector on said rockshaft, means for rotating said rockshaft and type sector, an impulse emitter on said rockshaft, a stepping counter having an electro-magnetic means impulsed by said emitter, contacts on the counter to interrupt the impulses to said electro-magnetic means upon the counter reaching zero, a trip pawl for arresting said type sector, a latch magnet for actuating said trip pawl, and other contacts on the counter to produce an impulse upon the counter reaching a predetermined value to cause said magnet to actuate said trip pawl to arrest said type sector.

5. In a recording device of the class described, a printing member having a series of number types thereon, means for moving said printing member to present said types sequentially at a printing position, arresting means for stopping said printing member, an impulse emitter, means for moving said impulse emitter in synchronism with said printing member, an accumulating device having denominational elements, electro-magnetic means impulsed by said emitter for advancing said elements, and means operated by said accumulating device on reaching a predetermined value for initiating an operation of said arresting means.

References Cited in the file of this patent

UNITED STATES PATENTS

| Number | Name | Date |
|---|---|---|
| 1,916,987 | Peirce | July 4, 1933 |
| 1,967,741 | Bryce | July 24, 1934 |
| 2,034,542 | Thomas | Mar. 17, 1936 |
| 2,239,524 | Johnstone et al. | Apr. 22, 1941 |
| 2,469,655 | Leathers | May 10, 1949 |